(12) United States Patent
Changlani et al.

(10) Patent No.: US 11,622,379 B2
(45) Date of Patent: Apr. 4, 2023

(54) ENHANCING TRIGGERED SINGLE USER TRANSMISSIONS IN WLAN NETWORKS

(71) Applicant: Hewlett Packard Enterprise Development LP, Houston, TX (US)

(72) Inventors: Nitin Changlani, Milpitas, CA (US); Eldad Perahia, Park City, UT (US); Sachin Ganu, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 60 days.

(21) Appl. No.: 17/172,321

(22) Filed: Feb. 10, 2021

(65) Prior Publication Data

US 2022/0256592 A1 Aug. 11, 2022

(51) Int. Cl.
*H04W 74/04* (2009.01)
*H04W 74/00* (2009.01)
*H04W 84/12* (2009.01)

(52) U.S. Cl.
CPC ......... *H04W 74/04* (2013.01); *H04W 74/006* (2013.01); *H04W 84/12* (2013.01)

(58) Field of Classification Search
None
See application file for complete search history.

(56) References Cited

U.S. PATENT DOCUMENTS

| 9,854,606 | B2 | 12/2017 | Seok |
| 10,021,224 | B2 | 7/2018 | Sun et al. |
| 10,034,227 | B1 | 7/2018 | Jiang et al. |
| 10,813,049 | B2 | 10/2020 | Sun et al. |
| 2006/0248429 | A1* | 11/2006 | Grandhi ................ H04L 1/1685 714/749 |
| 2014/0241268 | A1* | 8/2014 | Zhu ....................... H04W 74/04 370/329 |
| 2017/0149547 | A1* | 5/2017 | Kim ..................... H04B 7/2678 |
| 2017/0303275 | A1* | 10/2017 | Banerjea ........... H04W 72/0446 |
| 2017/0367118 | A1* | 12/2017 | Choi ..................... H04W 84/12 |
| 2018/0359806 | A1* | 12/2018 | Li ..................... H04W 72/0413 |
| 2021/0037571 | A1* | 2/2021 | Murayama ............ H04W 84/12 |

OTHER PUBLICATIONS

Ali, M. et al., Uplink Access Protocol in IEEE 802.11ac (Research Paper), IEEE Transactions on Wireless Communications, Aug. 8, 2018, vol. 17, No. 8, pp. 5535-5551.

* cited by examiner

*Primary Examiner* — The Hy Nguyen
(74) *Attorney, Agent, or Firm* — Hewlett Packard Enterprise Patent Department

(57) ABSTRACT

Examples of triggered single user (SU) transmissions are described. In an example, an access point (AP) may send a SU trigger frame to a client device for initiating a data transmission by the client device. The AP may detect whether the data transmission is initiated within the Short Interframe Spacing (SIFS) after the SU trigger frame is sent. Responsive to detecting that the data transmission is not initiated within the SIFS, the AP waits for the client device to initiate the data transmission within a predefined time interval after the SIFS. Responsive to detecting that the data transmission is not initiated within the predefined time interval, the AP repurposes the channel access after the predefined time interval is elapsed. Responsive to detecting that the data transmission is initiated within the predefined time interval, the AP repurposes channel access after one of an expiration of a maximum transmission opportunity (TXOP) duration and a completion of the data transmission, whichever is earlier.

17 Claims, 6 Drawing Sheets

ENHANCING TRIGGERED SINGLE USER TRANSMISSIONS IN WLAN NETWORKS

BACKGROUND

In recent years, Wireless Local Area Network (WLAN) technologies have emerged as a fast-growing market. One example of the various WLAN technologies is the Institute of Electrical and Electronics Engineers (IEEE) 802.11 standard. Client devices or stations (STAB) within WLANs communicate with access points (APs) to obtain access to one or more network resources. APs can refer to digital devices that may be communicatively coupled to one or more networks (e.g., Internet, an intranet, etc.). APs may be directly connected to the one or more networks or connected via a controller. An AP, as referred to herein, may include a wireless access point (WAP) that communicates wirelessly with devices using Wi-Fi, Bluetooth or related standards and that communicates with a wired network.

BRIEF DESCRIPTION OF DRAWINGS

The present disclosure, in accordance with one or more various embodiments, is described in detail with reference to the following figures. The figures are provided for purposes of illustration only and merely depict typical or example embodiments.

Figure 1:
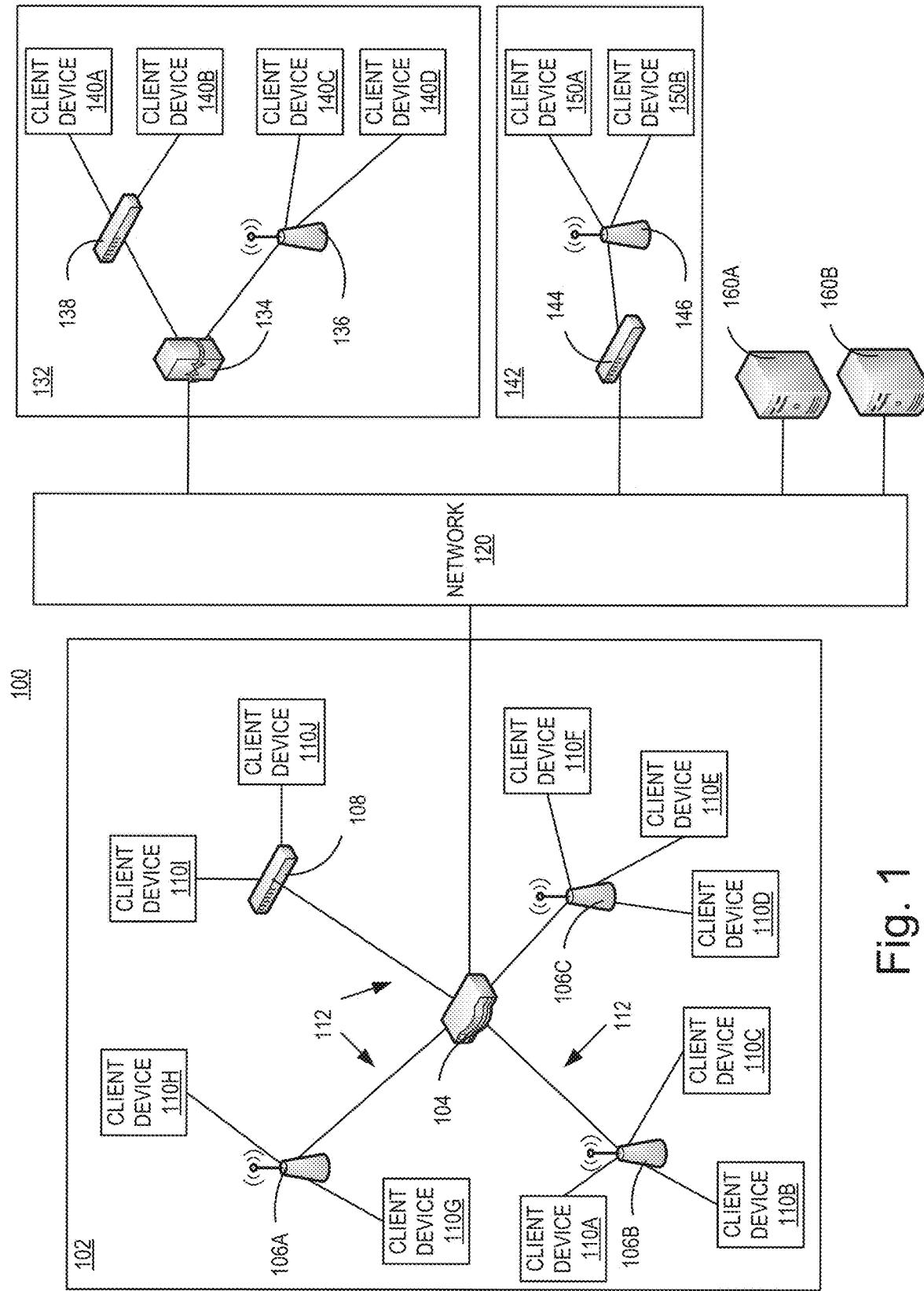
FIG. 1 illustrates an example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

A client device (or STA) in a Basic Service Set (BSS) can transmit frames to an AP or to another device (such as a peer-to-peer device) using a variety of schemes. These schemes can include Multi-User (MU) uplink (UL) schemes where the channel is accessed by multiple client devices simultaneously (i.e. at or around the same time, such as by full or partial bandwidth Multi-User Multiple Input Multiple Output (MU-MIMO), MU-Orthogonal Frequency Division Multiple Access (OFDMA), or a hybrid combination thereof). The channel can also be accessed by single user (SU) channel access schemes where the channel is accessed by a single client device at one time. Thus, WLAN devices can access the channel with MU and SU means.

The variety of channel access schemes may have several benefits, such as increasing information throughput on the channel. Thus, commonly APs operating in accordance with traditional channel access schemes may be focused on increasing information throughput of the channel by maximizing channel utilization. In an example scheduled/triggered single user (SU) channel access scheme, the AP may trigger or schedule channel access for a single client device at a time to allow the triggered client device to transmit data over the channel. The client may use the channel to transmit client data, for example, to the AP via the UL or to a peer-to-peer (P2P) device via a P2P link. The AP may send a SU trigger frame to the client device. When triggered by the SU trigger frame, the client device shall respond within a Short Interframe Spacing (SIFS) of receiving the SU trigger frame by initiating its data transmission. The SIFS is defined as the time period between two frames that need to be immediately one after another and, in an example, may be 16 microseconds. If the client device is unable to initiate its data transmission within SIFS of the SU trigger, once the SIFS is expired, the AP may repurpose the channel access for other transmissions, such as downlink (DL) transmissions or triggered UL transmissions by another client device. The AP is traditionally configured to repurpose the channel immediately after SIFS of the trigger to ensure that the channel does not remain idle for too long and high information throughput for the channel.

However, there may be situations where the client device is unable to transmit its data within SIFS from being triggered. For example, the client device may not have data traffic ready for transmission at that instance, because, in an example, data traffic may not have reached the client device from higher abstraction layers, or, data may be available at the client device but due to delay in data processing at the client, it is unable to initiate the data transmission within SIFS of the trigger, or, the client device may sense that the channel is busy, for example, due to interference in the channel. In such situations when the client is unable to initiate its data transmission within SIFS of the trigger, repurposing the channel access for other transmissions may cause the triggered client device to lose its transmission opportunity.

Further, there could be scenarios where even repurposing the channel access immediately after SIFS of the trigger, may leave the channel underutilized or may cause loss of airtime for the channel. In a scenario, the triggered client device may be the single active client device associated with the AP and the AP may not have any data to transmit on the DL. In this scenario, repurposing the channel access for DL transmissions, once the SIFS is expired, may be futile. Also repurposing channel access for triggered UL transmissions from other client devices is ineffectual since no other active client device is associated with the AP which can be triggered for initiating its transmissions. Thus, repurposing the channel access responsive to data transmission from the triggered client device not being initiated within SIFS from the trigger, may additionally render the channel unutilized for a certain duration apart from resulting in loss of transmission opportunity for the triggered client device.

There may be another scenario where, once SIFS after the sending the SU trigger frame is expired, the channel access is repurposed for the other transmissions and the AP senses interference in the channel. The interference in the channel may be from the same source of interference that could be blocking the triggered client device from initiating its UL transmissions. Thus, although the AP may have repurposed the channel access in response to UL data transmission from the triggered client not being initiated within the SIFS, due to the interference the channel may remain busy and the AP may not be able to reuse the channel for the other transmissions until the channel is free from the interference. In this scenario, although the channel access is repurposed away from the triggered client device which was idle beyond SIFS of the trigger, the channel may remain unutilized even after being repurposed thereby resulting in reduced airtime utilization for the channel. Repurposing the channel access on expiry of the SIFS may further cause a loss of transmission opportunity for the triggered client device.

There may be yet another scenario where the AP is configured to prioritize UL data transmissions from the triggered client device. In this scenario, repurposing the channel access on expiry of SIFS of the trigger may, in effect, lead to prioritization of DL transmissions or triggered UL transmissions from other client devices over UL data transmissions from the triggered client device. This may result in a loss of priority of the UL data transmissions from the triggered client device.

Therefore, in the above-explained scenarios, the AP attempting to reuse the channel for the other transmissions (DL transmission or triggered UL transmission from other clients) once the SIFS has elapsed, may be inefficiently repurposing channel access consequently resulting in either loss of airtime utilization of the channel and/or loss of transmission opportunity of the triggered client device. Thus, the overall SU trigger scheme may be rendered inefficient.

The present disclosure relates to techniques of configuring the AP such that a triggered client device is provided an opportunity to initiate its data transmission even if it fails to do so within SIFS of the trigger. According to the techniques of the present disclosure, an AP may send a single user (SU) trigger frame to a client device for initiating a data transmission by the client device. The AP may detect whether the data transmission is initiated within the SIFS after the SU trigger frame is sent. Responsive to detecting that the data transmission is not initiated within the SIFS, the AP waits for the client device to initiate the data transmission within a predefined time interval after the SIFS. In an example, the predefined time interval is the maximum TXOP duration. Responsive to detecting that the data transmission is not initiated within the predefined time interval, the AP repurposes the channel access after the predefined time interval is elapsed. Responsive to detecting that the data transmission is initiated within the predefined time interval, the AP repurposes channel access after one of an expiration of the maximum TXOP duration and a completion of the data transmission, whichever is earlier.

Thus, in accordance with the present techniques, the AP may wait for an extended time (i.e., the predefined time interval after the SIFS is elapsed) for the client device to initiate its data transmission. Technical advantages are realized throughout the application. For example, waiting for the predefined time interval beyond SIFS from the SU trigger prevents ineffective (at least in the scenarios as described earlier) reconfiguration of the AP to reuse the channel for the other transmissions. Since the AP waits for the predefined time interval beyond SIFS from the SU trigger, a better opportunity of a successful data transmission is provided to the triggered client device thereby improving communication efficiency for the triggered client device, though there could be slight reduction in information throughput of the channel.

Waiting for the predefined time interval after SIFS of the SU trigger also differs from traditional schemes of triggered transmissions in several ways. For example, in a traditional scheme of triggered transmission, the AP may not wait for the extended time after SIFS for a triggered client to transmit its data. Rather, if the client is unable to initiate data transmission within SIFS from the trigger, the AP may reuse the channel for other purposes (e.g., triggered transmissions from other clients or DL transmissions) to maximize information throughput of the channel. However, this may result in a reduced transmission opportunity for the triggered client which may not be ready to transmit within the limited period of SIFS from the SU trigger.

Also, in some examples, in traditional systems operating in accordance with a particular wireless specification (e.g., IEEE 802.11ax), scheduled UL MU transmissions from client devices shall start at exactly SIFS duration after the client devices (e.g. 802.11ax clients) receive a MU trigger frame because the preamble from all the client devices that are part of the UL MU transmission are required to be synchronized. With implementation of scheduled SU UL transmissions, APs operating in accordance with the particular wireless specification (say IEEE 802.11ax) may also expect to receive scheduled SU UL transmissions from the triggered client within the SIFS of the SU trigger. Such APs operating in accordance with the particular wireless specification may not wait for the predefined time interval after SIFS from the trigger to provide additional transmission opportunity for the triggered client. Rather, such AP may repurpose the channel immediately after SIFS, which may result in loss of transmission opportunity for the triggered client. Since synchronization of preambles is not required for triggered SU transmissions as just one client is transmitting at a time, waiting for the extended time beyond SIFS, as in the present techniques, does not hamper the transmission process while providing a better chance to the triggered client device to succeed in its data transmissions consequently resulting in communication efficiency. Further, technical advantages of the present techniques are described below.

In the scenario where the triggered client device is the single active client device associated with the AP, the AP by waiting for the predefined time period after SIFS of the trigger, may enable the triggered client device to get a better opportunity to successfully perform its UL data transmission even if it had failed to initiate the data transmission within SIFS of the trigger. This also prevents ineffectual repurposing of the channel access thereby facilitating better utilization of airtime of the channel.

Also, in the scenario where the AP is configured to prioritize UL data transmissions of the triggered client device, the AP by waiting for the predefined time interval after SIFS of the trigger may provide a better opportunity of successful UL data transmission by the triggered client device, consequently providing a higher chance of maintaining the priority of UL data transmissions from the triggered client device over DL or UL transmissions from other client devices. Also, in the scenario where the channel may be busy due to interference, the channel access may be retained by the triggered client device for a greater time period which may enable the triggered client device to initiate its UL transmissions at the earliest possible opportunity once it gets a clear channel, while the Max UL TXOP duration has not yet elapsed. This may provide an improved transmission opportunity of the triggered client device.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

The controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like. Client devices may also be referred to as stations (STA).

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

An AP generally refers to a networking device that allows a client device or STA to connect to a wired or wireless network, in this case, wireless network 100. An AP can include a processor, memory, and I/O interfaces, including wired network interfaces such as IEEE 802.3 Ethernet interfaces, as well as wireless network interfaces such as IEEE 802.11 WiFi interfaces, although examples of the disclosure are not limited to such interfaces. An AP can include memory, including read-write memory, and a hierarchy of persistent memory such as ROM, EPROM, and Flash memory. Moreover, as used herein, an AP may refer to receiving points for any known or convenient wireless access technology which may later become known. Specifically, the term AP is not intended to be limited to IEEE 802.11-based APs.

Wireless APs 106a-c are included as another example of a point of access to the network established in primary site 102 for client devices 110a-h. The APs 106a-c may control network access of the client devices 110a-h and may authenticate the client devices 110a-h for connecting to the APs and through the APs, to other devices within the network configuration 100. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150*a-b* access the network 120. Such a remote site 142 may represent, for example, an individual employee's home or a temporary remote office. The remote site 142 may also be in communication with the primary site 102, such that the client devices 150*a-b* at remote site 142 access network resources at the primary site 102 as if these client devices 150*a-b* were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160*a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160*a-b*. Content servers 160*a-b* may include various providers of multimedia downloadable and/or streaming content, including audio, video, graphical, and/or text content, or any combination thereof. Examples of content servers 160*a-b* include, for example, web servers, streaming radio and video providers, and cable and satellite television providers. The client devices 110*a-j*, 140*a-d*, 150*a-b* may request and access the multimedia content provided by the content servers 160*a-b*.

Figure 2:
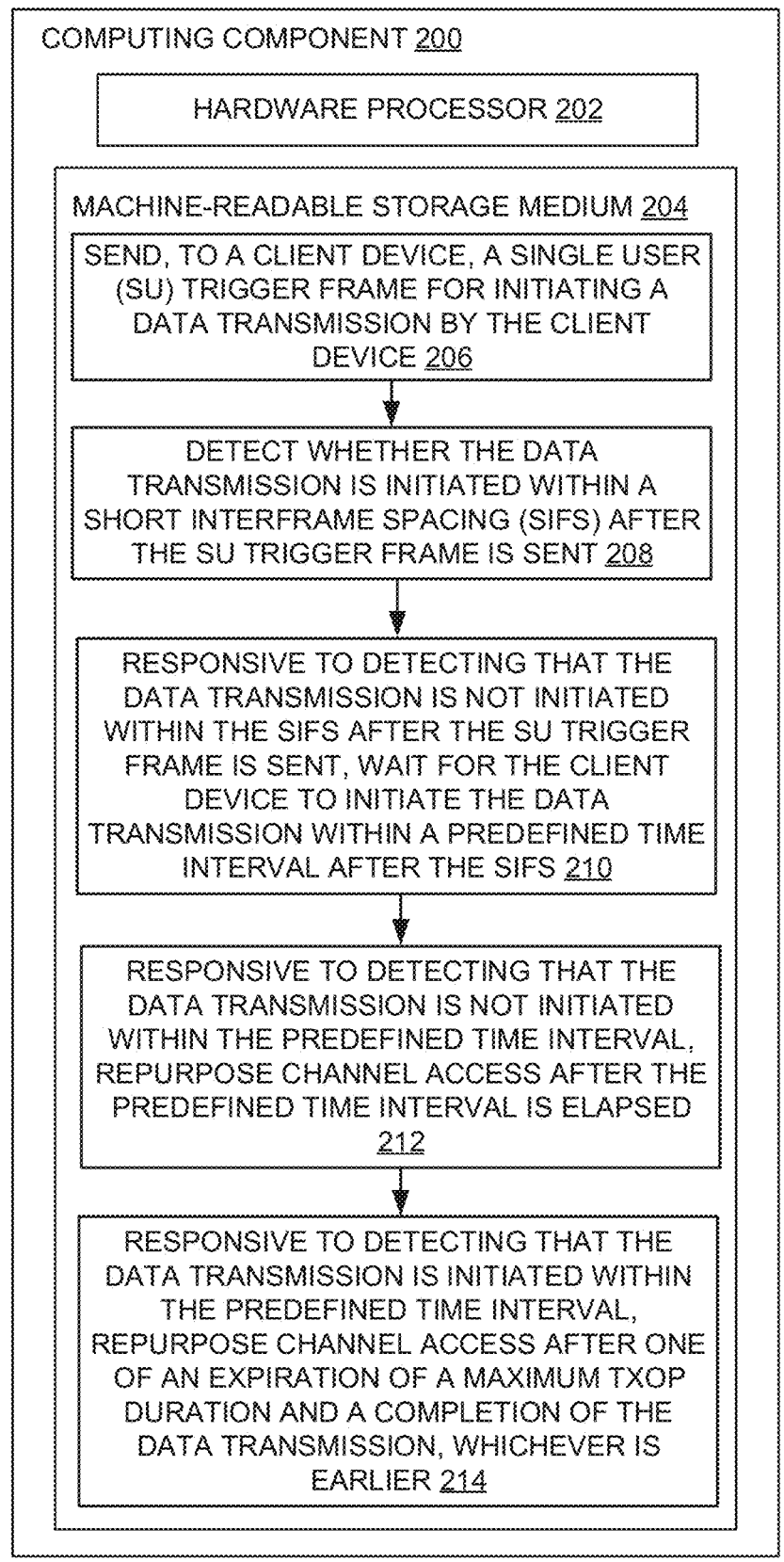
FIG. 2 is a block diagram of an example computing component or device for scheduling channel access in accordance with an embodiment.

FIG. 2 is a block diagram of an example computing component or device 200 for scheduling channel access to a client device. In an example, the computing component 200 may be an AP, as referred to in embodiments described herein.

In the example implementation of FIG. 2, the computing component 200 includes a hardware processor, 202, and machine-readable storage medium, 204. Hardware processor 202 may be one or more central processing units (CPUs), semiconductor-based microprocessors, and/or other hardware devices suitable for retrieval and execution of instructions stored in machine-readable storage medium, 204. Hardware processor 202 may fetch, decode, and execute instructions, such as instructions 206-214, to control processes or operations for scheduling channel access. As an alternative or in addition to retrieving and executing instructions, hardware processor 202 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 204, may be any electronic, magnetic, optical, or other physical storage device that contains or stores executable instructions. Thus, machine-readable storage medium 204 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 204 may be a non-transitory storage medium, where the term "non-transitory" does not encompass transitory propagating signals. As described in detail below, machine-readable storage medium 204 may be encoded with executable instructions, for example, instructions 206-214.

Further, although the steps shown in FIG. 2 are in an order, the shown order is not the only order in which the steps may be performed. Any step may be performed in any order, at any time, may be performed repeatedly, and/or may be performed by any suitable device or devices. The process shown in FIG. 2 is also discussed in FIG. 4, at a differing level of detail.

In step 206, an AP, such as an AP 1060 may send a SU trigger frame to a client device, such as one of the client devices 110D-110F. The SU trigger frame may include a NAV field indicative of a time duration for which the AP reserves the channel and a maximum TXOP duration field indicative of a maximum time duration for which the client device can transmit frames or a burst of frames. The SU trigger frame may be indicative to the client device to initiate a data transmission. The NAV field may provide an indication of the time for which the medium will remain busy. The TXOP is a time interval during which the triggered client can send as many frames as possible as long as the duration of the transmissions does not extend beyond the maximum duration of the TXOP mentioned in the maximum TXOP duration field of the SU trigger frame. The Maximum TXOP duration is a subset of the NAV duration. In an example, the data transmission may be an uplink (UL) data transmission from the client device to the AP or from the client device to another device, such as a peer-to-peer (P2P) device.

In step 208, the AP detects whether the data transmission is initiated within a Short Interframe Spacing (SIFS) after the SU trigger frame is sent. In an example, the AP may check whether any data from the client device is received via the uplink. In another example, the AP may also check whether the client device has started transmitting data to another device, such as a P2P device over a P2P link.

Responsive to detecting that the data transmission is not initiated within the SIFS after the SU trigger frame is sent, the AP waits for the client device to initiate the data transmission within a predefined time interval after the SIFS, in step 210. The predefined time interval may be one of less than and equal to the maximum TXOP duration. The predefined time interval may be configured by a network administrator within the AP.

In step 212, responsive to detecting that the data transmission is not initiated within the predefined time interval, the channel access is repurposed after the predefined time interval is elapsed. In an example, the transmission opportunity may be returned back to the AP, which may reuse the channel for downlink (DL) data transmissions or the AP may trigger a different client device. Thus, repurposing channel access may include one of initiating downlink (DL) data transmission and triggering SU data transmission for another client device.

In step 214, responsive to detecting that the data transmission is initiated within the predefined time interval, the channel access is repurposed after an expiration of a maximum TXOP duration or a completion of the data transmission, whichever is earlier. Thus, if the data transmission by the client device is initiated before the maximum TXOP duration, the AP allows the data transmission to continue up until the expiry of the maximum TXOP duration. Thus, the triggered client device is allowed to initiate its UL data transmission even after the lapse of the SIFS from the SU trigger frame, thereby facilitating better airtime utilization for the channel and improved transmission opportunity to the triggered client device.

Figure 3A:
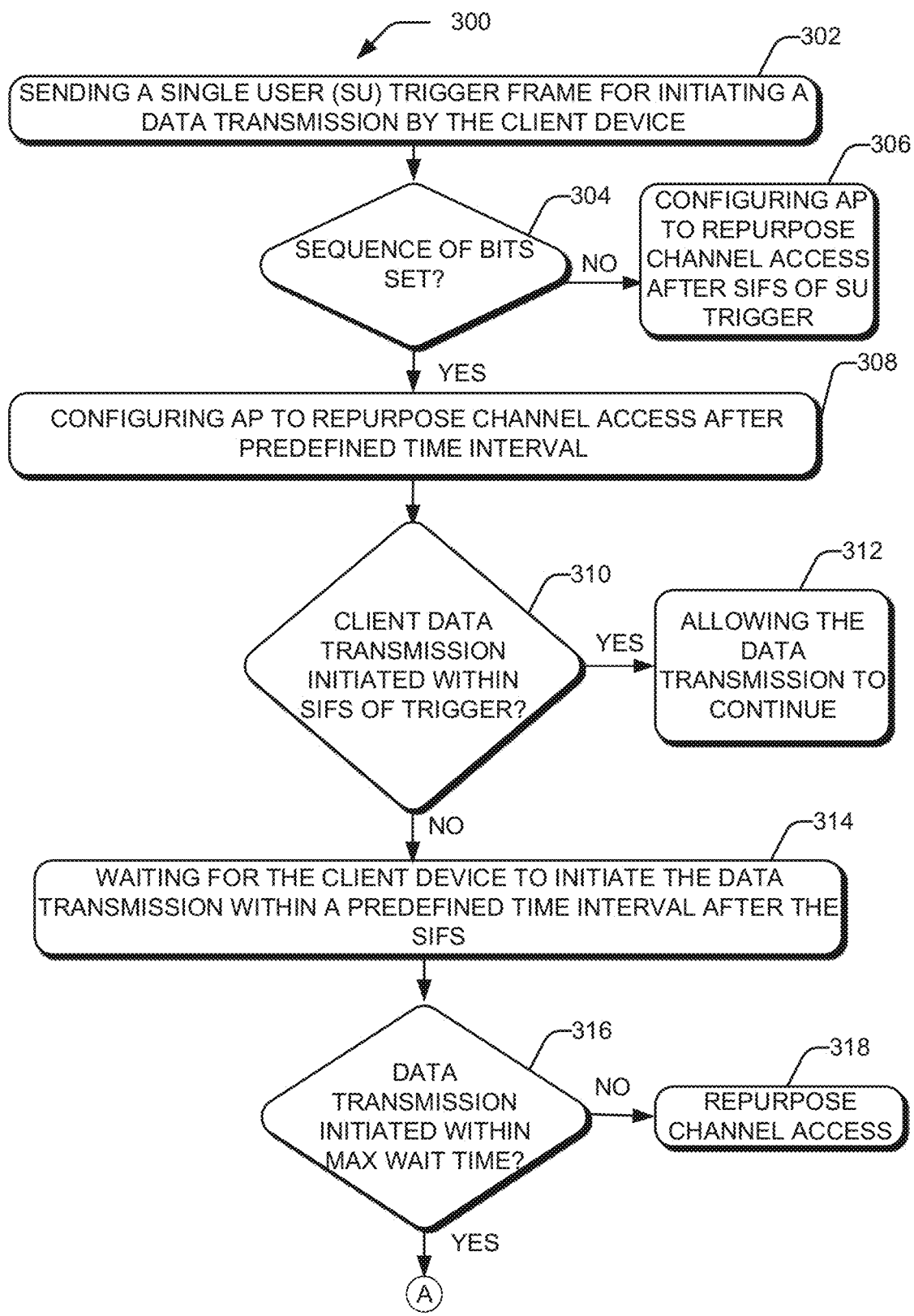
FIGS. 3A and 3B illustrate an example method for scheduling channel access in accordance with an embodiment.
Figure 3B:
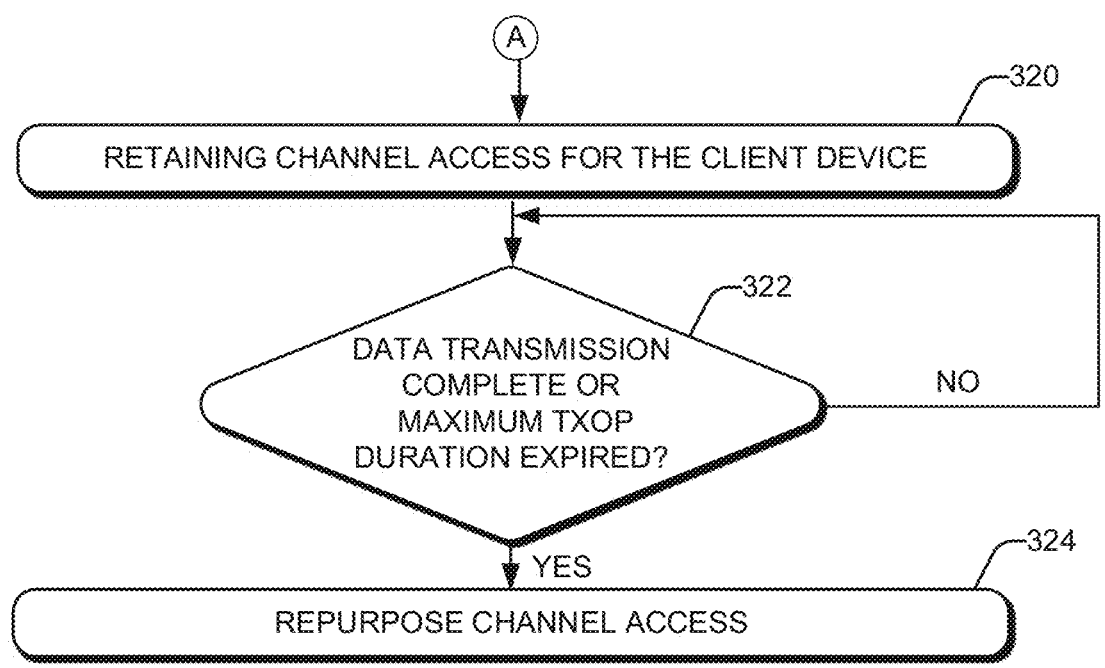

Further details of scheduling channel access to a client device are described referring to FIGS. 3A and 3B. FIGS. 3A and 3B illustrate an example method 300 for scheduling channel access in accordance with an embodiment. The method 300 may be executed by an AP. The method 300 can be implemented by processing resource(s) or computing device(s) through any suitable hardware, a non-transitory machine readable medium, or combination thereof. In an example, the method 300 may be performed by computer-readable instructions, which include instructions stored on a medium and executable by a processing resource of an AR It may be understood that processes involved in the method 300 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

At block 302, an AP, such as an AP 1060 of FIG. 1, to which client devices, such as client devices 110D-110F are connected may send a single user (SU) trigger frame for initiating a data transmission by a client device, say client device 110D. The SU trigger frame may include a NAV field, a maximum TXOP duration field, and a MAX WAIT TIME field indicative of a predefined time interval for which the AP is to wait for the client device to initiate a data transmission after SIFS of sending the SU trigger frame. "After SIFS of sending the SU trigger frame", as used herein, refers to a time period either equal to SIFS or slightly greater than SIFS from the time instance of the AP sending the SU trigger frame. In an example, the MAX WAIT TIME field may include a non-zero finite value that indicates the predefined time interval. Presence of the non-zero finite value in the MAX WAIT TIME field of the SU trigger may imply that the AP is to wait for the predefined time interval after SIFS of sending the SU trigger frame before repurposing the channel access. However, if no value is assigned to the MAX WAIT TIME field of the SU trigger, it may imply that the AP may repurpose the channel immediately after SIFS of sending the SU trigger. Alternatively, in another example, the AP may send beacons or probe responses to the client device defining a value of the predefined time interval. In such an example, the SU trigger frame may include a bit or a sequence of bits indicative of whether the channel access is to be repurposed responsive to detecting that the data transmission is not initiated within the predefined time interval (defined earlier through the beacons and probe responses) after the SU trigger frame is sent. For example, if the bit or sequence of bits is set, it may indicate that the AP is to wait for the predefined time interval after SIFS of sending the SU trigger frame before repurposing the channel access. However, if the bit or sequence of bits is not set, it may indicate that the AP may repurpose the channel after SIFS of sending the SU trigger.

At block 304, it is checked whether the sequence of bits is set. On determining that the sequence of bits is not set ('No' branch from block 304), the AP is configured to repurpose channel access after SIFS of sending the SU trigger, at block 306. If the sequence of bits is set ('Yes' branch from block 304), the AP is configured to repurpose the channel access, responsive to detecting that the data transmission is not initiated by the client device within the predefined time interval after the SU trigger frame is sent, at block 308.

Figure 4:
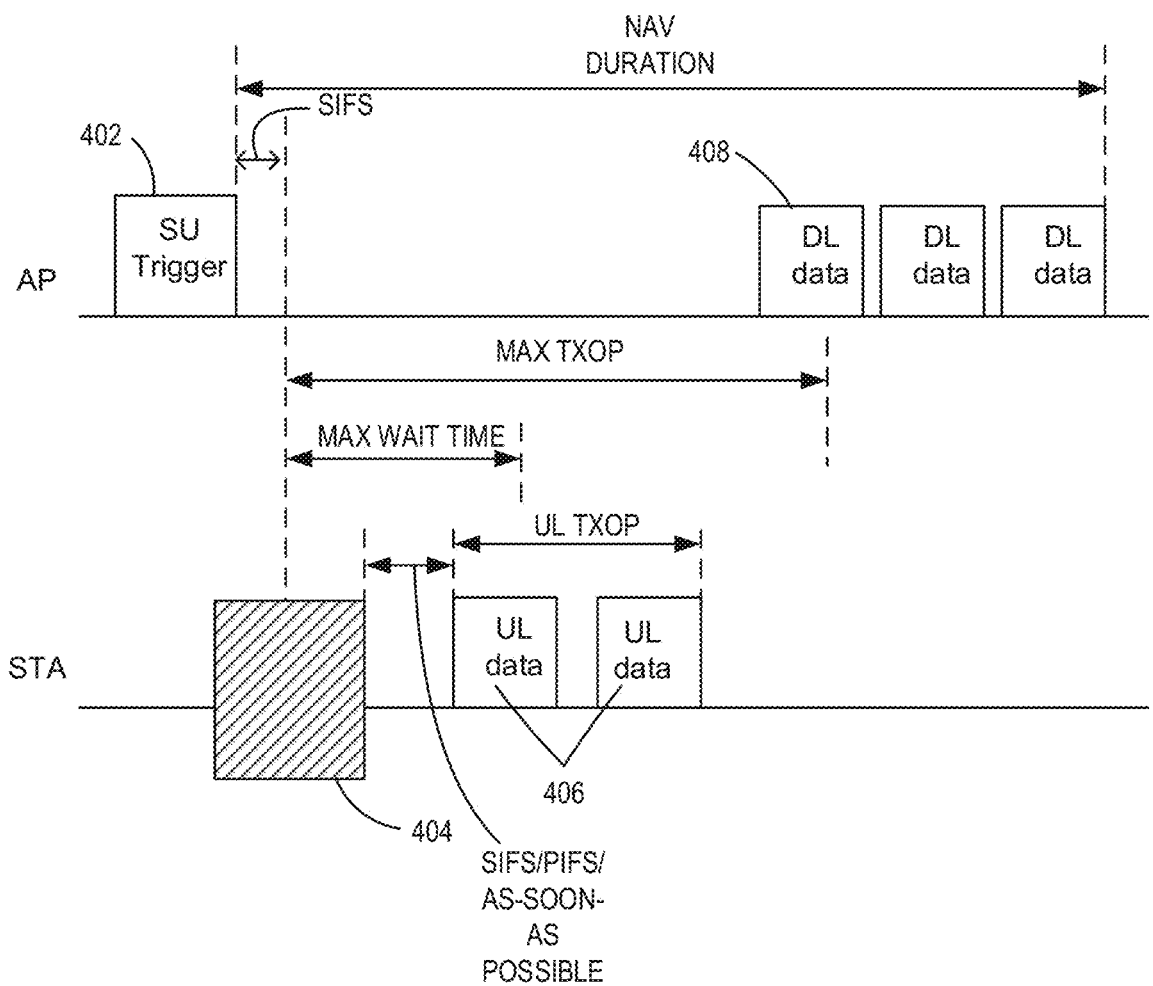
FIG. 4 depicts an example of scheduling channel access for a client device and data transmission by the scheduled client device in accordance with an embodiment.

Referring to FIG. 4, consider that a SU trigger frame 402 is sent by the AP to the client device. The client device senses that the channel is busy or the client device is not ready to initiate the data transmission, as indicated by shaded box 404. Consider that the sequence of bits is set.

At block 310, it is detected whether the data transmission is initiated within a SIFS after the SU trigger frame is sent. In an example, the AP may monitor data transmissions from the client device over the uplink to the AP or from the client device to any other device (such as a P2P device) to detect if data transmission is initiated by the client device. If the data transmission is initiated within the SIFS of the trigger, the AP allows the data transmission to continue until the maximum TXOP duration is elapsed or the data transmission is complete, whichever is earlier, at block 312.

However, as shown in FIG. 4, if the client device detects that the channel is still busy after SIFS of the SU trigger, or the client device is not yet ready to initiate the data transmission, the data transmission may not be initiated within SIFS of the trigger. Responsive to detecting that the data transmission is not initiated within the SIFS after the SU trigger frame is sent ('No' branch from block 310), the AP waits for the client device to initiate the data transmission within a predefined time interval after the SIFS of the trigger, at block 314. The predefined time interval is referenced to as MAX WAIT TIME in FIG. 4. The value of the predefined time interval may be defined in the SU trigger frame sent by the AR In an example, the predefined time interval is one of less than and equal to the maximum TXOP duration.

At block 316, it is checked whether the data transmission by the client device is initiated within the predefined time interval (MAX WAIT TIME). Responsive to detecting that the data transmission is not initiated within the MAX WAIT TIME ('No' branch from block 316), the channel access may be repurposed at block 318, i.e., the AP may utilize the medium for other transmissions.

Responsive to detecting that the data transmission is initiated within the predefined time interval (MAX WAIT TIME) ('YES' branch from block 316), channel access for the client device is retained at block 320. Retaining the channel access of the client device may include allowing the triggered client device to have access to the medium for data transmission. Referring to FIG. 4, the client device has initiated UL data transmission 406 within the MAX WAIT TIME. Since, the UL data transmission 406 is initiated within the MAX WAIT TIME from the SIFS, the AP allows the data transmission by the client device. In an example, the UL data transmission may be initiated within SIFS or Point Coordination Function (PCF) Interframe Spacing (PIFS), or as soon as possible from when the channel is available, or the client device is ready to transmit the data. Thus, UL data transmission 406 initiated within the MAX WAIT TIME may be received by the AP. Although in FIG. 4, the data transmission from the client device is shown as UL data, in an example, the client device may also use this transmission opportunity to transmit data to other devices, such as to other peer devices over a P2P link.

Figure 5:
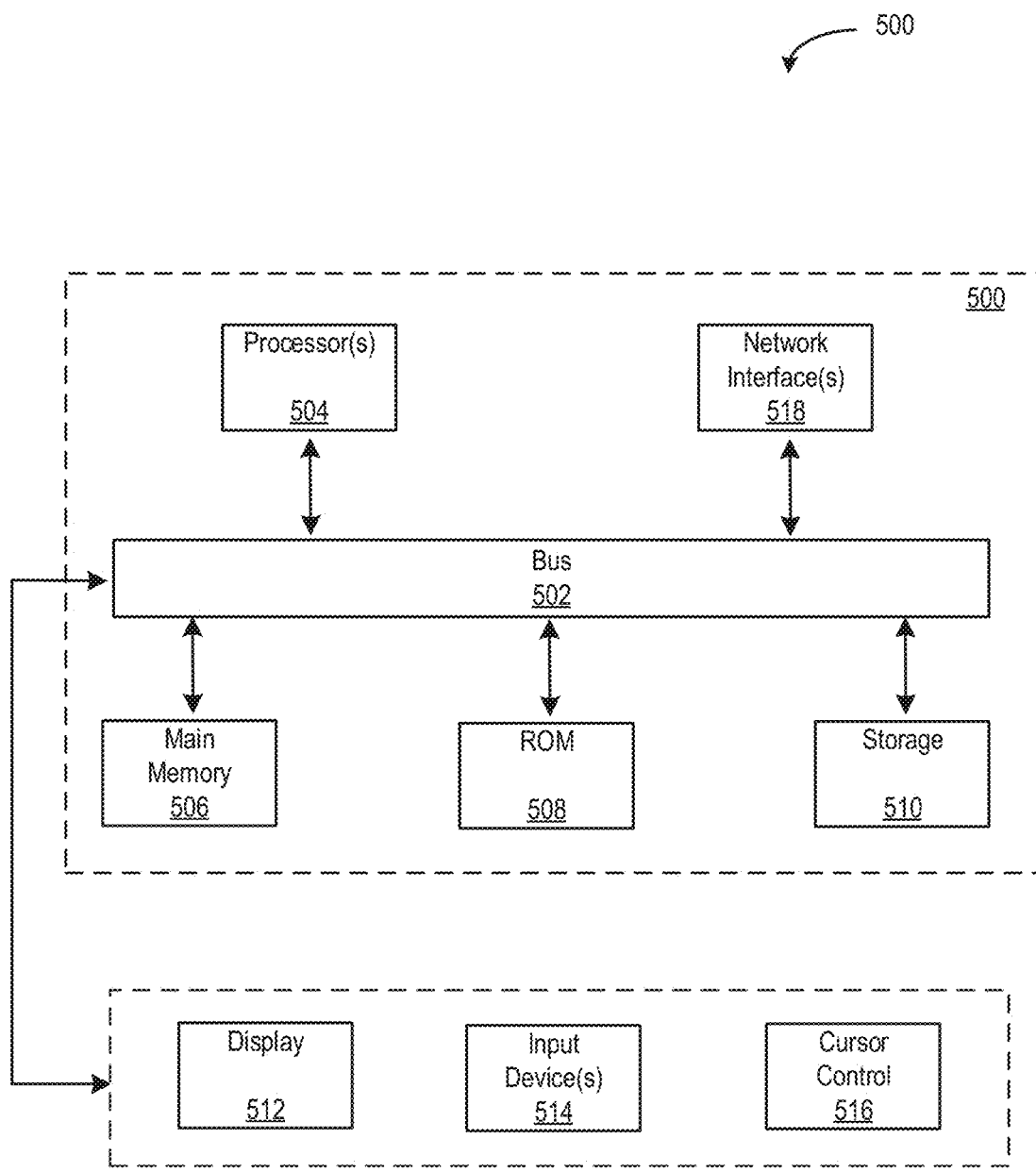
FIG. 5 depicts a block diagram of an example computer system in which the embodiments described herein may be implemented.

At block 322, it is checked whether the data transmission by the client device is complete or maximum TXOP duration has expired. If either the data transmission is complete or maximum TXOP duration has expired (Yes' branch from block 322), the channel access is repurposed, at block 324. Referring to FIG. 4, the UL data transmission 406 is complete within a UL TXOP duration which is less than the maximum TXOP duration, Thus, in this case, since the data transmission by the client device is complete, the AP may repurpose channel access and allow initiating downlink (DL) data transmission 408. The DL data transmission 408 may continue for the NAV duration. If, however, the data transmission by the client device is incomplete and maximum TXOP duration has not expired, the client device may be allowed to continue with its data transmission, FIG. 5 depicts a block diagram of an example computer system 500 in which the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media, Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518. The received code may be executed by processor 504 as it is received, and/or shared in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner, Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits, Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 400.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

We claim:

1. A method for scheduled channel access, comprising:
   sending, by an access point (AP) to a client device, a single user (SU) trigger frame for initiating a data transmission by the client device;
   detecting, by the AP, whether the data transmission is initiated within a Short Interframe Spacing (SIFS) after the SU trigger frame is sent;
   responsive to detecting that the data transmission is not initiated within the SIFS after the SU trigger frame is sent, waiting, by the AP, for the client device to initiate the data transmission within a predefined time interval after the SIFS;
   responsive to detecting that the data transmission is not initiated within the predefined time interval, repurposing, by the AP, channel access after the predefined time interval is elapsed, wherein the SU trigger frame includes a sequence of bits indicative of whether the channel access is repurposed responsive to detecting that the data transmission is not initiated within the predefined time interval after the SU trigger frame is sent; and
   responsive to detecting that the data transmission is initiated within the predefined time interval, repurposing, by the AP, channel access after one of an expiration of a maximum transmission opportunity (TXOP) duration and a completion of the data transmission.

2. The method of claim 1, wherein repurposing channel access comprises one of:
- initiating downlink (DL) data transmission; and
- triggering SU data transmission for another client device.

3. The method of claim 1, wherein the predefined time interval is one of less than and equal to the maximum TXOP duration.

4. The method of claim 1, wherein the SU trigger frame includes a field indicative of the predefined time interval.

5. The method of claim 1, further comprising:
- receiving the data transmission before the predefined time interval is elapsed; and
- allowing the data transmission to continue until the maximum TXOP duration is elapsed.

6. The method of claim 1, wherein the data transmission is from the client device to one of the AP and a peer-to-peer device.

7. An access point (AP) comprising:
- a processor; and
- a memory coupled to the processor, the memory storing instructions executable by the processor to:
  - send, to a client device, a single user (SU) trigger frame for initiating a data transmission by the client device;
  - detect whether the data transmission is initiated within a Short Interframe Spacing (SIFS) after the SU trigger frame is sent;
  - responsive to detecting that the data transmission is not initiated within the SIFS after the SU trigger frame is sent, wait for the client device to initiate the data transmission within a predefined time interval after the SIFS;
  - responsive to detecting that the data transmission is not initiated within the predefined time interval, repurpose channel access after the predefined time interval is elapsed, wherein the SU trigger frame includes a sequence of bits indicative of whether the channel access is repurposed responsive to detecting that the data transmission is not initiated within the predefined time interval after the SU trigger frame is sent; and
  - responsive to detecting that the data transmission is initiated within the predefined time interval, repurpose channel access after one of an expiration of a maximum transmission opportunity (TXOP) duration and a completion of the data transmission.

8. The AP of claim 7, wherein repurposing channel access comprises one of:
- initiating downlink (DL) data transmission; and
- triggering SU data transmission for another client device.

9. The AP of claim 7, wherein the predefined time interval is one of less than and equal to the maximum TXOP duration.

10. The AP of claim 7, wherein the SU trigger frame includes a field indicative of the predefined time interval.

11. The AP of claim 7, wherein the processor is further to:
- receive the data transmission before the predefined time interval is elapsed; and
- allow the data transmission to continue until the maximum TXOP duration is elapsed.

12. The AP of claim 7, wherein the data transmission is from the client device to one of the AP and a peer-to-peer device.

13. A non-transitory computer-readable medium comprising computer-readable instructions, the computer-readable instructions when executed by a processor, cause the processor to:
- send, to a client device, a single user (SU) trigger frame for initiating a data transmission by the client device;
- detect whether the data transmission is initiated within a Short Interframe Spacing (SIFS) after the SU trigger frame is sent;
- responsive to detecting that the data transmission is not initiated within the SIFS after the SU trigger frame is sent, wait for the client device to initiate the data transmission within a predefined time interval after the SIFS;
- responsive to detecting that the data transmission is not initiated within the predefined time interval, repurpose channel access after the predefined time interval is elapsed, wherein the SU trigger frame includes a sequence of bits indicative of whether the channel access is repurposed responsive to detecting that the data transmission is not initiated within the predefined time interval after the SU trigger frame is sent; and
- responsive to detecting that the data transmission is initiated within the predefined time interval, repurpose channel access after one of an expiration of a maximum transmission opportunity (TXOP) duration and a completion of the data transmission.

14. The non-transitory computer-readable medium of claim 13, wherein instructions to repurpose channel access comprises instructions to one of:
- initiate downlink (DL) data transmission; and
- trigger SU UL data transmission for another client device.

15. The non-transitory computer-readable medium of claim 13, wherein the predefined time interval is one of less than and equal to a maximum UL TXOP duration.

16. The non-transitory computer-readable medium of claim 13, wherein the SU trigger frame includes a field indicative of the predefined time interval.

17. The non-transitory computer-readable medium of claim 13, wherein the computer-readable instructions further cause the processor to:
- receive the data transmission before the predefined time interval is elapsed; and
- allow the data transmission to continue until the maximum TXOP duration is elapsed.

* * * * *